(12) United States Patent
Nguyen et al.

(10) Patent No.: US 8,707,319 B2
(45) Date of Patent: Apr. 22, 2014

(54) RESOURCE LOCATION VERIFICATION BY COMPARING AND UPDATING RESOURCE LOCATION WITH A LOCATION OF A CONSUMER DEVICE AFTER A THRESHOLD OF LOCATION MISMATCHES IS EXCEEDED

(75) Inventors: Loc Duc Nguyen, Berkeley, CA (US); Chris S. Nelson, Foster City, CA (US); Charles Quach, Pacifica, CA (US)

(73) Assignee: Visa International Service Association, San Francisco, CA (US)

( * ) Notice: Subject to any disclaimer, the term of this patent is extended or adjusted under 35 U.S.C. 154(b) by 585 days.

(21) Appl. No.: 12/492,356

(22) Filed: Jun. 26, 2009

(65) Prior Publication Data
US 2009/0328052 A1   Dec. 31, 2009

Related U.S. Application Data

(60) Provisional application No. 61/076,110, filed on Jun. 26, 2008.

(51) Int. Cl.
| G06F 9/46 | (2006.01) |
| G06F 21/00 | (2013.01) |
| G06Q 20/00 | (2012.01) |
| G06Q 40/00 | (2012.01) |
| G06F 7/00 | (2006.01) |

(52) U.S. Cl.
USPC .............. 718/104; 718/106; 705/56; 705/73; 705/43; 707/690

(58) Field of Classification Search
None
See application file for complete search history.

(56) References Cited

U.S. PATENT DOCUMENTS

| 4,423,287 | A | 12/1983 | Zeidler |
| 4,578,530 | A | 3/1986 | Zeidler |
| 5,745,576 | A | 4/1998 | Abraham et al. |
| 5,761,306 | A | 6/1998 | Lewis |
| 5,878,337 | A | 3/1999 | Joao et al. |
| 5,920,847 | A | 7/1999 | Kolling et al. |
| 5,963,925 | A | 10/1999 | Kolling et al. |
| 6,003,014 | A | 12/1999 | Lee et al. |
| 6,003,763 | A | 12/1999 | Gallagher et al. |
| 6,005,942 | A | 12/1999 | Chan et al. |
| 6,018,717 | A | 1/2000 | Lee et al. |
| 6,105,008 | A | 8/2000 | Davis et al. |
| 6,119,103 | A | 9/2000 | Basch et al. |
| 6,128,391 | A | 10/2000 | Denno et al. |
| 6,179,205 | B1 | 1/2001 | Sloan |
| 6,233,683 | B1 | 5/2001 | Chan et al. |
| 6,240,187 | B1 | 5/2001 | Lewis |
| 6,247,129 | B1 | 6/2001 | Keathley et al. |

(Continued)

OTHER PUBLICATIONS

U.S. Appl. No. 60/982,682, filed Oct. 25, 2007.

(Continued)

*Primary Examiner* — Meng An
*Assistant Examiner* — Wissam Rashid
(74) *Attorney, Agent, or Firm* — Kilpatrick Townsend Stockton LLP

(57) ABSTRACT

A method to be implemented using a computer system, the method comprising the steps of providing a resource database that specifies locations of resources for use by consumers, receiving a location communication originated by a mobile consumer device associated with a consumer at a time temporally proximate a time when the consumer accesses a resource where the location communication indicates the location of the consumer device and using the location of the consumer device indicated in the communication to update the resource database.

18 Claims, 9 Drawing Sheets

(56) References Cited

U.S. PATENT DOCUMENTS

| | | |
|---|---|---|
| 6,273,335 B1 | 8/2001 | Sloan |
| 6,282,522 B1 | 8/2001 | Davis et al. |
| 6,298,336 B1 | 10/2001 | Davis et al. |
| 6,367,011 B1 | 4/2002 | Lee et al. |
| 6,370,648 B1 | 4/2002 | Diep |
| 6,385,595 B1 | 5/2002 | Kolling et al. |
| 6,402,028 B1 | 6/2002 | Grahan, Jr. et al. |
| 6,481,632 B2 | 11/2002 | Wentker et al. |
| 6,519,248 B1 * | 2/2003 | Valko .......................... 370/352 |
| 6,542,813 B1 * | 4/2003 | Kovacs ........................ 701/484 |
| 6,560,581 B1 | 5/2003 | Fox et al. |
| 6,594,666 B1 * | 7/2003 | Biswas et al. ..................... 1/1 |
| 6,658,393 B1 | 12/2003 | Basch et al. |
| 6,671,811 B1 | 12/2003 | Diep et al. |
| 6,769,066 B1 | 7/2004 | Botros et al. |
| 6,808,111 B2 | 10/2004 | Kashef et al. |
| 6,920,611 B1 | 7/2005 | Spaeth et al. |
| 7,004,385 B1 * | 2/2006 | Douglass ...................... 235/379 |
| 7,007,840 B2 | 3/2006 | Davis |
| 7,039,611 B2 | 5/2006 | Devine |
| 7,051,923 B2 | 5/2006 | Nguyen et al. |
| 7,121,456 B2 | 10/2006 | Spaeth et al. |
| 7,124,937 B2 | 10/2006 | Myers et al. |
| 7,152,782 B2 | 12/2006 | Shenker et al. |
| 7,243,853 B1 | 7/2007 | Levy et al. |
| 7,280,981 B2 | 10/2007 | Huang et al. |
| 7,374,078 B2 | 5/2008 | Spaeth et al. |
| 7,376,431 B2 * | 5/2008 | Niedermeyer ............. 455/456.3 |
| 7,407,094 B2 | 8/2008 | Myers et al. |
| 7,451,114 B1 | 11/2008 | Matsuda et al. |
| 7,464,870 B2 | 12/2008 | Nguyen et al. |
| 7,499,886 B2 | 3/2009 | Matsuda et al. |
| 7,866,544 B1 * | 1/2011 | Block et al. ..................... 235/379 |
| 2002/0055924 A1 * | 5/2002 | Liming ......................... 707/100 |
| 2004/0019522 A1 | 1/2004 | Bortolin et al. |
| 2004/0050922 A1 | 3/2004 | Gauthier et al. |
| 2004/0054581 A1 | 3/2004 | Redford et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0121506 A1 | 6/2005 | Gauthier et al. |
| 2005/0258230 A1 * | 11/2005 | Wiater .......................... 235/375 |
| 2006/0290501 A1 | 12/2006 | Hammad et al. |
| 2006/0293027 A1 | 12/2006 | Hammad et al. |
| 2007/0017970 A1 | 1/2007 | Gauthier et al. |
| 2007/0034679 A1 | 2/2007 | Gauthier et al. |
| 2007/0057034 A1 | 3/2007 | Gauthier et al. |
| 2007/0250925 A1 | 10/2007 | Levy et al. |
| 2007/0294182 A1 | 12/2007 | Hammad |
| 2008/0005037 A1 | 1/2008 | Hammad et al. |
| 2008/0029593 A1 | 2/2008 | Hammad et al. |
| 2008/0034221 A1 | 2/2008 | Hammad et al. |
| 2008/0040271 A1 | 2/2008 | Hammad et al. |
| 2008/0040276 A1 | 2/2008 | Hammad et al. |
| 2008/0065553 A1 | 3/2008 | Faith et al. |
| 2008/0103982 A1 | 5/2008 | Hammad et al. |
| 2008/0116264 A1 | 5/2008 | Hammad et al. |
| 2008/0120236 A1 | 5/2008 | Faith et al. |
| 2008/0128513 A1 | 6/2008 | Hammad et al. |
| 2008/0163257 A1 | 7/2008 | Carlson et al. |
| 2008/0179394 A1 | 7/2008 | Dixon et al. |
| 2008/0179395 A1 | 7/2008 | Dixon et al. |
| 2008/0183565 A1 | 7/2008 | Dixon et al. |
| 2008/0193622 A1 | 8/2008 | Haedelt et al. |
| 2008/0201212 A1 | 8/2008 | Hammad et al. |
| 2008/0203151 A1 | 8/2008 | Dixon et al. |
| 2008/0203152 A1 | 8/2008 | Hammad et al. |
| 2008/0203170 A1 | 8/2008 | Hammad et al. |
| 2008/0208681 A1 | 8/2008 | Hammad et al. |
| 2008/0222038 A1 | 9/2008 | Eden et al. |
| 2008/0303632 A1 | 12/2008 | Hammad |
| 2008/0314971 A1 | 12/2008 | Faith et al. |
| 2008/0314994 A1 | 12/2008 | Faith et al. |
| 2008/0319889 A1 | 12/2008 | Hammad |
| 2008/0319911 A1 | 12/2008 | Faith et al. |
| 2008/0319912 A1 | 12/2008 | Faith et al. |
| 2009/0078777 A1 | 3/2009 | Granucci et al. |
| 2009/0081990 A1 | 3/2009 | Granucci et al. |
| 2009/0083191 A1 | 3/2009 | Hammad |
| 2009/0088229 A1 | 4/2009 | Hammad et al. |
| 2009/0089213 A1 | 4/2009 | Hammad |

OTHER PUBLICATIONS

U.S. Appl. No. 12/258,007, filed Oct. 24, 2008.
U.S. Appl. No. 12/257,958, filed Oct. 24, 2008.
U.S. Appl. No. 12/257,179, filed Oct. 23, 2008.
U.S. Appl. No. 12/257,095, filed Oct. 23, 2008.
U.S. Appl. No. 12/257,987, filed Oct. 24, 2008.
U.S. Appl. No. 12/257,212, filed Oct. 23, 2008.
U.S. Appl. No. 12/258,322, filed Oct. 24, 2008.
U.S. Appl. No. 12/492,395, filed Jun. 26, 2009.

* cited by examiner

RESOURCE LOCATION VERIFICATION BY COMPARING AND UPDATING RESOURCE LOCATION WITH A LOCATION OF A CONSUMER DEVICE AFTER A THRESHOLD OF LOCATION MISMATCHES IS EXCEEDED

CROSS-REFERENCE TO RELATED APPLICATIONS

The present application claims the benefit of priority under 35 U.S.C. §119 from U.S. Provisional Application No. 61/076,110 entitled "Resource Locator Verification Method and Apparatus" filed on Jun. 26, 2008, the disclosure of which is hereby incorporated by reference in its entirety for all purposes.

FIELD

The present invention relates to methods and apparatus for updating locations of ATMs and other resource providers (e.g., merchants) and more specifically to methods and apparatus for using location enabled mobile wireless consumer devices (e.g., mobile phones) to maintain accurate resource locations in a database.

BACKGROUND

Resource locator databases have been around for a long time. Early locator databases were passive. For instance, a yellow pages telephone book comprises an early and rudimentary locator database wherein the locations of thousands of merchants can be identified with relative ease. With the advent of ubiquitous computing devices and wired and wireless computing networks, interactive resource locator programs have been developed for accessing locator database information. These locator programs enable a computer, phone, personal digital assistant, etc., user to identify locations of resources such as restaurants, gas stations, ATM machines, etc. Merchants and other service providers desire to be included in locator databases so that consumers that require products or services offered by the merchants and that rely on the locator databases to find providers can consider the merchants as potential providers.

Interactive program based locators have several advantages over passive databases like phone books. First, interactive program based locators can use minimal user input (e.g., a provider name, a general location, a type of provider sought, etc.) to examine large provider databases extremely quickly and narrow down options to a small desired subset. For instance, when used to locate restaurants of a particular type, a processor based locator can quickly examine all restaurants in a given geographical area and present all options within the area relatively quickly. Second, interactive program based locators often include graphical interfaces that can be used to show an area map and locations of resources sought relative to landmarks in the area. Graphical maps reduce the burden associated with finding a resource. Third, interactive program based locators can be tied in to other software programs such as direction generating programs, resource provider web sites, independent provider review web sites, etc., that can generate detailed directions for a consumer to find a particular resource, provide information directly from the provider and/or provide independent reviews of provider services and/or products.

Visa provides at least one interactive program based locator service for locating automatic teller machines (ATMs). To this end, a service user can use any Internet enabled device (e.g., a computer, a mobile phone with Internet capabilities, etc.) to access a graphical Visa ATM locator web site. Once the locator site is accessed, a user can specify a general area (e.g., by city and zip code) and the locator program uses the general area to locate all ATMs within the general area. The locator program then presents a map of the general area and provides a separate icon for each ATM within the general area along with ATM addresses.

While program based locator systems are quickly becoming ubiquitous, one problem with such systems is that location information stored in the locator databases used by locator service providers can be inaccurate as businesses relocate and/or go out of business and as other businesses start new operations in new locations. In addition, in many cases locator service providers rely on business owners to provide location information for the databases and that information cannot be easily verified or audited. For instance, in the case of the Visa ATM locator service, despite efforts to maintain all ATM locations accurately in a database, at any given time about 10% of the location information in the Visa databases is inaccurate.

When a consumer uses a locator service to attempt to locate a resource provider and location information is inaccurate, the consumer quickly comes to view the locator service as unreliable. In addition, failed resource location activities damage brand impression for both the locator service provider and the resource provider that the consumer was unable to locate or had difficulty locating. For example, when a consumer uses a locator service to locate a coffee house and then walks five blocks to reach the coffee house location specified by the locator service only to find that the coffee house is no longer at the specified location, both the locator service provider and the coffee house suffer brand damage and the coffee house will likely loose a sale (i.e. assuming that the coffee house is still operating at a different location).

SUMMARY

It has been recognized that one way to substantially reduce inaccuracies in resource provider location databases is to take advantage of capabilities of location enabled personal electronic devices that are becoming ubiquitous in many countries including the United States. To this end, each year a greater percentage of personal electronic devices (e.g., cellular telephones) manufactured and sold are being equipped with global positioning system (GPS) capabilities so that the locations of the devices can be determined within a few feet of their actual positions. It is believed that within the next few years virtually all cellular telephones sold will be GPS enabled and that a large percentage of people that have credit cards will also have a GPS enabled wireless telephone.

When a person carries a GPS enabled device, the location of the person carrying the device can be quickly identified via a GPS system including, for instance, satellites and mobile network towers that are linked to a mobile network operator server. According to at least some embodiments of the present invention, a location enabled device (e.g., a device that can either identify its own location or can cooperate with other devices to identify its location) may be used for performing a financial transaction (e.g., a purchase from a merchant, withdrawal of funds from a bank account at an ATM, etc.) with a merchant (i.e., a resource provider, an ATM owner) at a merchant location. During or immediately temporally proximate the time during which the transaction is occurring, the location of the location enabled device can be determined and compared to a stored merchant location in a resource provider database where the stored location specifies a previously identified location for the merchant. When the device location matches the merchant location, the merchant location is verified and no action occurs. When, however, the device location is different than the merchant location, the disparity in location indicates that the stored location in the database may be inaccurate. Where a stored merchant location is inaccurate any of several different processes may be performed.

For instance, in some embodiments when the stored merchant location is inaccurate, the inaccuracy will be communicated to either the location service manager or to the resource provider (i.e., an ATM owner, a merchant, etc.). In some embodiments inaccuracies are tallied over time and when the percentage of inaccuracies exceeds some threshold level over a set number of transactions, the inaccuracies are reported so that the location information can be corrected. In still other cases inaccuracies may lead to modifications of the resources presented by a locator service. For instance, where the stored location of an ATM is clearly inaccurate, the ATM may be removed as a locator service option. In still other cases, where the stored location is inaccurate but, over the coarse of several resource accessing activities (e.g., 30 ATM transactions) the identified location of the resource is always or generally consistent, the resource location may be automatically updated in the database to reflect the consistent location.

Consistent with the above, at least some embodiments of the invention include a method to be implemented using a computer system, the method comprising the steps of providing a resource database that specifies locations of resources for use by consumers, receiving a location communication originated by a mobile consumer device associated with a consumer at a time temporally proximate a time when the consumer uses the resource where the location communication indicates the location of the consumer device and using the location of the consumer device indicated in the communication to update the resource database.

In some cases the method further includes the steps of receiving an access communication indicating that a consumer has accessed a resource where the access communication includes information usable to identify the consumer device associated with the resource using consumer, identifying the consumer device associated with the resource using consumer and commencing a request communication to the mobile consumer device requesting the location of the consumer device. In some embodiments the mobile consumer device is a GPS enabled mobile consumer device and wherein the location communication originated by the mobile consumer device and the request communication to the mobile consumer device are wireless communications. In some embodiments the GPS enabled mobile consumer device determines its location using GPS.

In some cases the resource database correlates resource locations with identities of specific resources and wherein the step of receiving an access communication includes receiving an access communication that also identifies the resource accessed by the consumer, the step of using the location of the consumer device to update including using the location of the consumer device to verify the location of the resource identified in the access communication. In some embodiments the resource is an automatic teller machine (ATM) and wherein the step of receiving an access communication indicating that a consumer has accessed a resource includes receiving an access transmission indicating that a consumer has accessed the ATM.

In some cases the method further includes the step of providing a consumer database that correlates consumer identities with consumer devices, wherein the step of receiving an access communication indicating that a consumer has accessed a resource includes receiving an access communication that also includes the identity of the resource using consumer, the step of identifying a consumer device associated with the resource using consumer including accessing the consumer database and identifying the consumer device associated with the consumer identified in the received access communication. In some embodiments the step of receiving a location communication that indicates the location of the consumer device includes receiving a location communication while the consumer is accessing the resource.

In some cases the step of using the location of the consumer device associated with the resource using consumer to update the resource database includes using the location of the consumer device associated with the resource using consumer to verify the location of one of the resources in the resource database, wherein, each time the location of a resource in the resource database is verified, the verification is a verification event for the resource, the method further including the steps of, for each resource listed in the resource database, tracking the duration of a period since the last verification event for the resource and, when the period since the last verification event for a resource exceeds a maximum verification period, performing a notice function. In some cases the method further includes the steps of providing an available resource database for access by consumers that lists resources that are available for use by consumers and, wherein, the notice function includes removing a resource from the available resource database for which the period since the last verification event exceeds the maximum verification period.

In some cases, when the location of the consumer device is different than the location of the resource specified in the resource database, the method further including the step of performing a secondary process to identify the location of the resource identified in the received transmission. In some embodiments the resource is associated with a resource operator, the step of performing a secondary function including communicating a notice to the resource operator notifying the resource operator that the resource location is unverified.

In some embodiments, when the location of the consumer device is different than the location of the resource specified in the resource database, the method further includes the step of performing a secondary process to identify the location of the resource identified in the received transmission, wherein the secondary process includes incrementing a different location counter associated with the resource identified in the received access communication and, when the different location counter associated with a resource identified in the received access communication exceeds a threshold value, generating a notice that the location of the resource associated with the counter is unverified.

In some cases the method further includes the steps of providing an available resource database that lists resources that are available for use by consumers, the secondary process including incrementing a different location counter associated with the resource identified in the received access communication and, when the different location counter associated with the resource identified in the received access communication exceeds a threshold value, removing the resource from the available resource database. In some cases the resource database includes a counter for each of the resources in the database, the method further including the steps of incrementing the counter for a resource in the database each time the resource is accessed by any consumers and using the counter values to generate notices for associated resources. In some cases the notices indicate levels of recommendations for using specific resources.

In some embodiments the step of receiving a location communication originated by a mobile consumer device includes the consumer device transmitting location information. In some embodiments the method further includes the steps of transmitting a location request communication to the consumer device requesting the location of the consumer device and receiving the location communication from the consumer device. In some cases the consumer device is used to access the resource and wherein, when the consumer device is used to access the resource, the consumer device automatically generates the location communication. In some embodiments the consumer device is a GPS enabled mobile phone. In some embodiments the consumer device is used to access the resource.

Other embodiments include a method to be implemented using a computer system, the method comprising the steps of providing a resource database that specifies locations of resources for use by consumers, receiving an access communication indicating that a consumer has accessed a resource where the access communication includes information usable to identify a GPS enabled consumer device associated with the resource using consumer and information usable to identify the resource accessed by the consumer, using the information usable to identify the consumer device to identifying the consumer device associated with the resource using consumer, transmitting a request to the identified consumer device via a mobile network operator (MNO) that is associated with the identified consumer device requesting the location of the consumer device, receiving a location communication from the identified consumer device via the MNO at a time temporally proximate a time when the consumer accesses the resource where the location communication indicates the location of the identified consumer device, using the resource database to identify the location of the resource identified in the access communication, comparing the location of the identified consumer device to the location of the identified resource and updating the resource database as a function of the results of the comparison.

In some embodiments the information usable to identify a GPS enabled consumer device associated with the resource using consumer includes the identity of the resource using consumer, the method further including the steps of providing a consumer database that correlates consumer identities with consumer devices, the step of using the information usable to identify the consumer device to identifying the consumer device associated with the resource using consumer including accessing the consumer database and identifying the consumer device associated with the identity of the resource using consumer.

In some embodiments the resource is an automatic teller machine (ATM) and wherein the step of receiving an access communication indicating that a consumer has accessed a resource includes receiving an access transmission indicating that a consumer has accessed the ATM.

Some embodiments include an apparatus for maintaining a list of resources and associated resource locations, the apparatus comprising a resource database that specifies locations of resources for use by consumers, a processor that has access to the resource, the processor running a software program that causes the processor to perform the steps of receiving a location communication originated by a mobile consumer device associated with a consumer at a time temporally proximate a time when the consumer accesses a resource where the location communication indicates the location of the consumer device and using the location of the consumer device indicated in the communication to update the resource database.

In some embodiments the process further performs the steps of receiving an access communication indicating that a consumer has accessed a resource where the access communication includes information usable to identify the consumer device associated with the resource using consumer, identifying the consumer device associated with the resource using consumer and commencing a request communication to the mobile consumer device requesting the location of the consumer device. In some embodiments the mobile consumer device is a GPS enabled mobile consumer device and wherein the location communication originated by the mobile consumer device and the request communication to the mobile consumer device are wireless communications.

In some embodiments the resource database correlates resource locations with identities of specific resources and wherein the processor performs the step of receiving an access communication by receiving an access communication that also identifies the resource accessed by the consumer, the processor performing the step of using the location of the consumer device to update by using the location of the consumer device to verify the location of the resource identified in the access communication. In some embodiments the resource is an automatic teller machine (ATM) and wherein the step of receiving an access communication indicating that a consumer has accessed a resource includes receiving an access transmission indicating that a consumer has accessed the ATM.

In some cases the method further includes a consumer database that correlates consumer identities with consumer devices, wherein the processor performs the step of receiving an access communication indicating that a consumer has accessed a resource by receiving an access communication that also includes the identity of the resource using consumer, the processor performing the step of identifying a consumer device associated with the resource using consumer by accessing the consumer database and identifying the consumer device associated with the consumer identified in the received access communication. In some embodiments the processor performs the step of receiving a location communication that indicates the location of the consumer device by receiving a location communication while the consumer is accessing the resource.

In some embodiments the resource database includes a counter for each of the resources in the database, the processor further performing the steps of incrementing the counter for a resource in the database each time the resource is accessed by any consumer and using the counter values to generate notices for associated resources. In some embodiments the notices indicate levels of recommendations for using specific resources.

Some embodiments include an apparatus for maintaining a list of resources and associated resource locations, the apparatus comprising a resource database that specifies locations of resources for use by consumers, a computer that can access the resource database, the computer running a program to perform the step of receiving an access communication indicating that a consumer has accessed a resource where the access communication includes information usable to identify a GPS enabled consumer device associated with the resource using consumer and information usable to identify the resource accessed by the consumer, using the information usable to identify the consumer device to identifying the consumer device associated with the resource using consumer, transmitting a request to the identified consumer device via a mobile network operator (MNO) that is associated with the identified consumer device requesting the location of the consumer device, receiving a location communication from the identified consumer device via the MNO at a time temporally proximate a time when the consumer accesses the resource where the location communication indicates the location of the identified consumer device, using the resource database to identify the location of the resource identified in the access communication, comparing the location of the identified consumer device to the location of the identified resource and updating the resource database as a function of the results of the comparison.

Some embodiments include a method to be implemented using a computer system, the method for maintaining merchant locations in a merchant database and comprising the steps of providing a merchant database that correlates merchants with merchant locations, receiving a location communication originated by a mobile consumer device associated with a consumer at a time temporally proximate a time when the consumer is at a location associated with a merchant wherein the location communication indicates the location of the consumer device and using the location of the consumer device indicated in the communication to verify the location of at least one merchant in the merchant database.

In some cases the method further includes the steps of receiving an access communication indicating that a consumer has interacted with the merchant at the location associated with the merchant where the access communication includes information usable to identify the consumer device associated with the consumer, identifying the consumer device associated with the consumer and commencing a request communication to the mobile consumer device requesting the location of the consumer device. In some embodiments the mobile consumer device is a GPS enabled mobile consumer device and wherein the location communication originated by the mobile consumer device and the request communication to the mobile consumer device are wireless communications.

In some embodiments the merchant database correlates merchant locations with identities of specific merchants and wherein the step of receiving an access communication includes receiving an access communication that also identifies the merchant associated with the location at which the consumer resides, the step of using the location of the consumer device to verify including using the location of the consumer device to verify the location of the merchant identified in the access communication. In some embodiments the access communication is transmitted when the consumer purchases a resource from the merchant. In some embodiments the access communication is transmitted when the consumer uses a credit card to purchase a resource from the merchant.

In some cases the method further includes the step of providing a consumer database that correlates consumer identities with consumer devices, wherein the step of receiving an access communication indicating that a consumer is at a location associated with a merchant includes receiving an access communication that also includes the identity of the consumer, the step of identifying a consumer device associated with the consumer including accessing the consumer database and identifying the consumer device associated with the consumer identified in the received access communication. In some embodiments the method further includes the steps of transmitting a request communication to the consumer device via a Mobile Network Operator (MNO) requesting the location of the consumer device and receiving the location communication from the consumer device via the MNO.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DESCRIPTION

Figure 1:
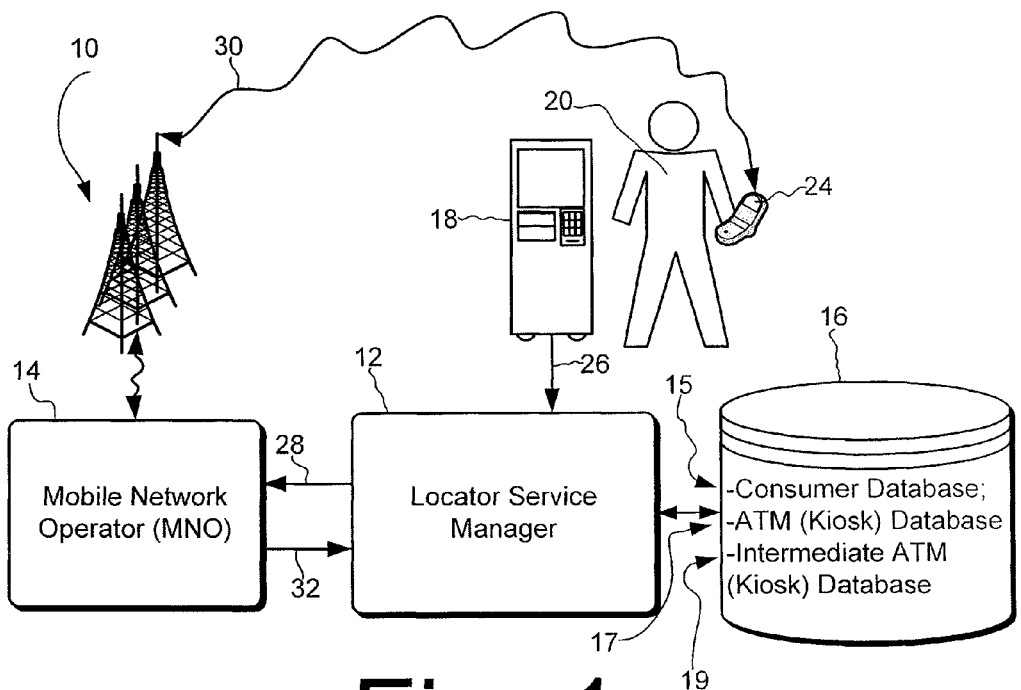
FIG. 1 is a schematic diagram illustrating a system including a locator service manager in which the methods and apparatus of present invention may be used.

Hereafter, unless indicated otherwise, the inventive system and methods will be described in the context of a locator service for automatic teller machines (ATMs) where the devices used to access the ATMs include location enabled wireless mobile phones. Nevertheless, it should be appreciated that the system and methods described hereafter could be used to support any type of locator service including but not limited to merchant locator services. In addition, it should be recognized that, in addition to using mobile phones as location determining devices, may other types of devices that can be associated with a particular system user and that are location enabled may be used instead of a mobile phone. For instance, a mobile computer, a personal digital assistant (PDA), a key fob, an article of clothing, an article of jewelry (e.g., a pin, a ring, a button, etc.), etc., could all be used to facilitate inventive methods. ATM machines and other point of service devices (e.g., a credit information reader or receiver) may be referred to generally as kiosks hereafter.

Referring now to the drawings wherein like reference numerals correspond to similar elements throughout the several views and, more specifically, referring to FIG. 1, the present invention will be described in the context of an exemplary system 10 in which a consumer 20 uses an automatic teller machine (ATM) or kiosk to obtain cash from a bank or checking account or to obtain cash using a line of credit where the system 10 includes one or more mobile network operators (MNO) 14, a location service manager 12 and at least one database 16. Consumer 20 employs a personal consumer apparatus in the form of a location enabled mobile phone 24.

Mobile wireless telephone 24, in at least some embodiments of the present invention, is location enabled meaning that the location of mobile phone 24 can be determined when a system user accesses an ATM 18. For example, in at least some embodiments, phone 24 is global positioning system (GPS) enabled such that phone 24 can use signals generated by satellites or the like to estimate its location within a few feet of its actual location. In other embodiments, phone 24 may be able to receive signals from local beacons that are then used to identify location. For instance, merchants within a shopping mall proximate an ATM 18 may be equipped with localized beacon signal generators that generate wireless beacons signals that can be sensed by phone 24 when the phone is in the vicinity of the merchants. The beacon signals may include location information so that phone 24 can identify its location via the beacon signals. Herein, the phrases "location enabled," "position enable," "GPS enabled," etc., should be construed as having similar meanings unless indicated otherwise.

Locator service manager 12 may be any entity that provides an electronic locator service to consumers via computers, mobile telephones, PDAs, etc. Manager 12 is linked via a network (e.g., the Internet, a private network, etc.) to each of the ATMs 18 so that information regarding ATM use can be received therefrom. Manager 12 includes a processor or server (not illustrated or labeled) that runs software programs that can be used by consumers 20 to identify locations of ATMs 18 within a geographic area. To this end, manager 12 has access to an ATM database described in more detail below that correlates merchant identifiers with merchant locations. In addition, manager 12 may also have access to information or software algorithms that enable the manager 12 to provide specific directions to consumers for traveling to specific ATMs.

Referring still to FIG. 1, mobile network operator 14 provides mobile computing and communication services such as wireless phone services, paging services, data transmission services, and so on. In at least some embodiments of the present invention locator service manager 12 is linked to mobile network operator 14 for two-way communication. The mobile network operator 14 can communicate wirelessly (see 30) with mobile phone 24 to provide information there to and receive information therefrom.

Figure 2:
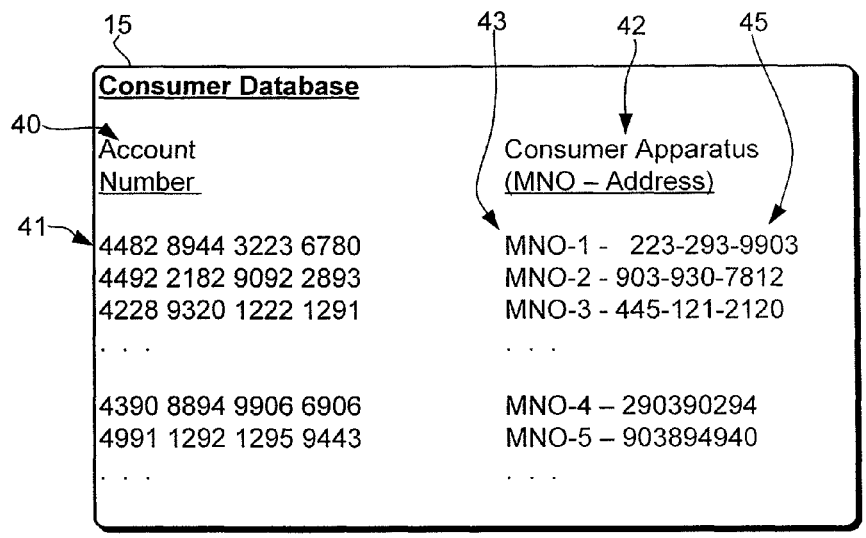
FIG. 2 is a schematic diagram illustrating an exemplary consumer database that may be used by the locator service manager shown in FIG. 1.

Referring still to FIG. 1, database 16 includes at least two sub-databases including a consumer database 15 and an ATM database 17. Referring also to FIG. 2, consumer database 15 includes information specifying distinct ATM accounts and correlating those accounts with information related to specific consumer apparatus (i.e., specific mobile phones in the present example). To this end, exemplary database 15 includes an ATM account number column 40 and a consumer apparatus column 42. The account number column 40, as the label implies, lists all ATM account numbers that are assigned to consumers that use location enabled mobile phones to access ATMs. Here, while account numbers are provided in column 40, it should be appreciated that any information useable to uniquely identify a specific account may be used. Consumer apparatus column 42 lists a separate consumer apparatus for each of the account numbers in column 40. In column 42, the customer apparatus is identified by the mobile network operator 14 that supports the apparatus and an apparatus address. Where the customer apparatus is a mobile phone, the apparatus address is a telephone number associated with the phone. Where the apparatus type is other than a phone, the apparatus address may be some other identifying number or identifier. Thus, for example, first account number 41 in column 40 is associated with a mobile phone having phone number 45 and is supported by a first mobile network operator 43. Other ID numbers in column 40 are associated with other network operators and mobile phone numbers.

Although not illustrated, it is contemplated that two or more account numbers in column 40 could be associated with a single consumer apparatus in column 42. Similarly, in some cases a single account number in column 40 may be associated with two or more consumer apparatus in column 42 (e.g., where a consumer has both a work mobile phone and a personal mobile phone).

Figure 3:
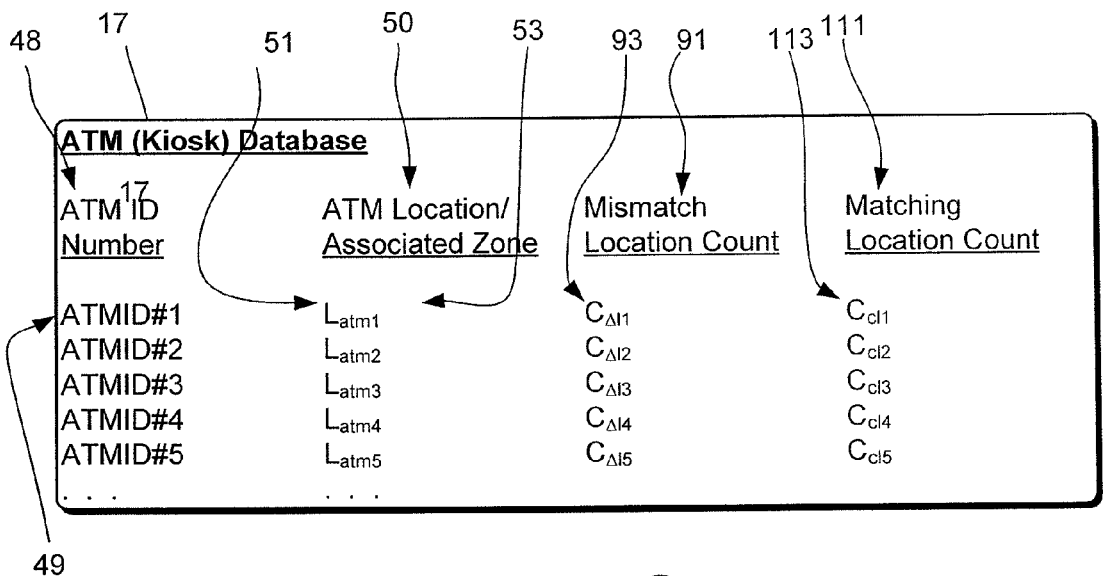
FIG. 3 is a schematic diagram illustrating an ATM database that may be used by the locator service manager of FIG. 1.

Referring now to FIG. 3, an exemplary ATM database 17 is illustrated that correlates specific ATMs with specific geographic locations. To this end, database 17 includes an ATM ID number column 48 and an ATM location column 50. ATM ID number column 48 lists all ATMs that have been registered with the locator service manager 12. Here, while column 48 includes ATM ID numbers, it should be appreciated that any information useable to uniquely identify specific ATMs may be provided in column 48. Location column 50 lists a separate stored location for each one of the ATMs in column 48. Thus, for example, for a first ATM 49 in column 48, the location 51 in column 50 is identified by label $L_{atm1}$. The ATM location will generally correspond to a relatively small area immediately adjacent the ATM. At least initially the ATM locations in column 50 are typically provided by ATM owners/operators.

Although each of the exemplary databases 15 and 17 and other databases to be described hereafter are shown in table form, it should be appreciated that the databases can and likely would take on more sophisticated configurations and therefore the invention should not be limited to table type formats. More sophisticated database formats are well known in the database art and therefore are not described here in detail.

Referring once again to FIG. 1, according to at least some inventive embodiments, when a consumer 20 uses mobile phone 24 to access an ATM 18, account identifying information such as an account number and a personal identification number (PIN) is transmitted wirelessly from mobile phone 24 to ATM 18. The account number, PIN number or other information is then transmitted as part of an access communication 26 to location service manager 12. In addition to including the consumer account identifying information, the access communication includes information useable to identify the ATM 18 accessed by the consumer. In at least some embodiments, the ATM 18 identifying information will include ATM ID number.

When locator service manager 12 receives the access communication, manager 12 performs several processes. First, manager 12 accesses consumer database 15 (see again FIG. 2) and uses the account number information from the access communication to identify the consumer apparatus associated or correlated therewith. In the present example, manager 12 identifies a mobile wireless phone in column 42 that is associated with the account number received in the access communication. Next, manager 12 transmits a location request communication 28 to the mobile network operator 14 that supports the consumer apparatus as indicated in column 42 to request the location of the mobile wireless telephone used to access the ATM. Operator 14 transmits the location request communication (see 30 in FIG. 1) to mobile phone 24 causing mobile phone 24 to transmit a location communication to the operator 14 indicating the location of mobile phone 24. Operator 14 sends the location communication to manager 12.

Referring still to FIG. 1 and also to FIG. 3, in addition, manager 12 accesses ATM database 17 and uses the ATM identifying information from the access communication 26 to identify the location in column 50 associated with the ATM. Next, manager 12 compares the ATM location to the location of the mobile wireless phone 24. Where the location of the mobile phone 24 matches the ATM location, the ATM location in the database 17 is accurate and verified. If, however, the location of the mobile phone is other than the location of the ATM, the ATM location in database 17 may be inaccurate. Where the ATM location in database 17 is possibly inaccurate, a notice communication may be provided to the locator service manager 12 or to an owner and operator of the ATM 18 or to both of those entities indicating that the location is possibly inaccurate. Where ATM location is determined to be inaccurate, the location may be corrected by the ATM operator. In at least some embodiments of the present invention, until the ATM location is corrected, the ATM may be removed from the database of ATMs that is used to drive the locator service.

Figure 5:
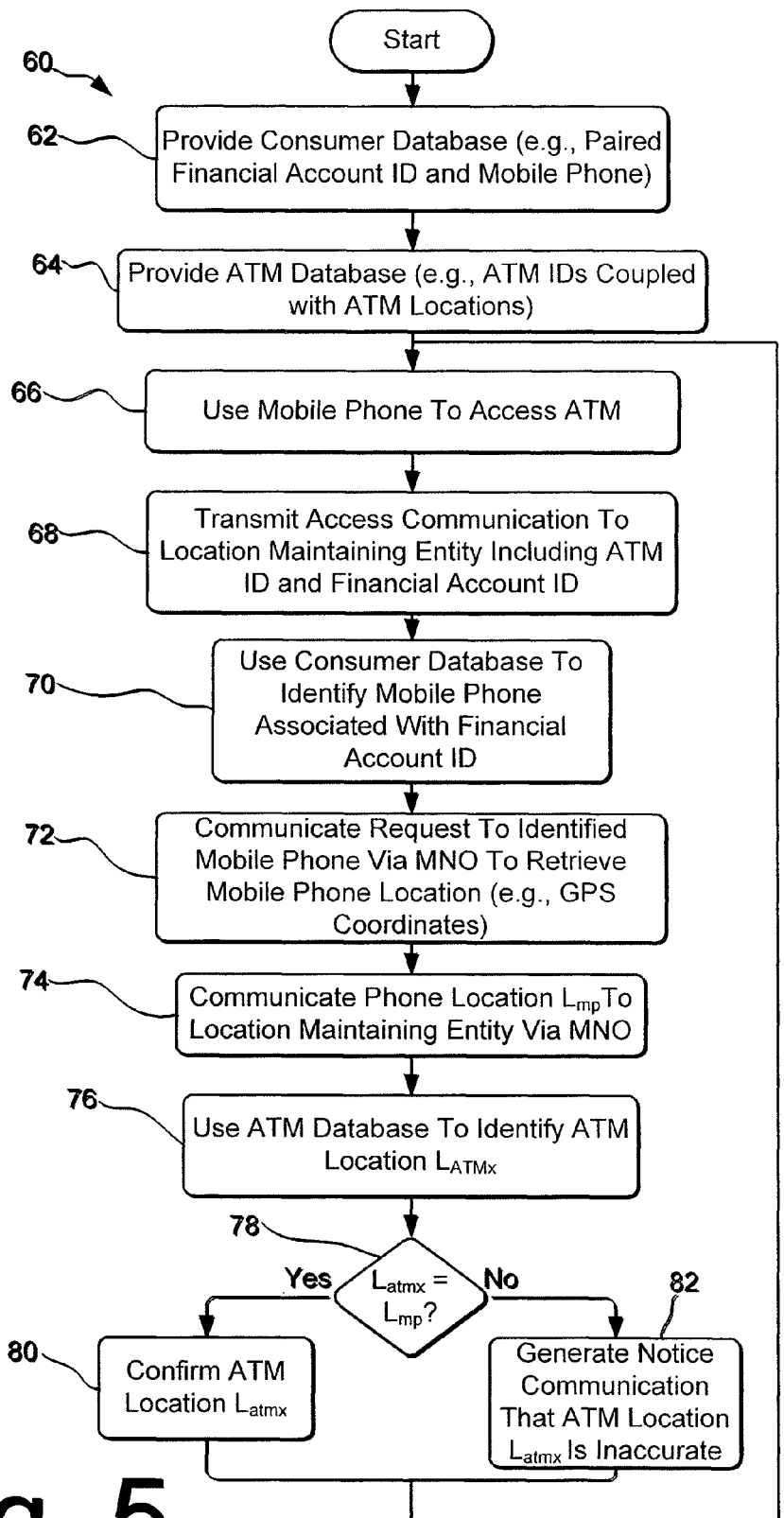
FIG. 5 is a schematic diagram illustrating a method for determining a location of a mobile phone used to access an ATM to facilitate a transaction and for comparing the mobile phone location to a stored ATM location to verify the stored ATM location.

Referring now to FIG. 5, the exemplary method briefly described above is shown in flow chart form. Referring also to FIGS. 1, 2 and 3, at block 62, consumer database 15 is provided which correlates financial account information (e.g., bank, credit account IDs) and mobile phones. At block 64, the ATM database 17 (see FIG. 3) is provided which correlates ATM specifying information with ATM locations.

Continuing, at block 66, consumer 20 uses her location enabled mobile phone 24 to access ATM 18. At block 68, ATM 18 transmits an access communication to locator service manager 12 including ATM and consumer account identifying information. At block 70, manager 12 uses consumer database 15 to identify the mobile phone 24 associated with the account information received in the access communication 26. At block 72, manager 12 transmits a location request communication 28 to mobile phone 24 via operator 14 requesting location information from mobile phone 24. At block 74, mobile phone 24 transmits a location communication 30 including the mobile phone location $L_{mp}$ to manager 12 via operator 14.

At block 76, manager 12 uses ATM database 17 to identify the location $L_{atmx}$ of the ATM specified in the access communication 26. At block 78, manager 12 compares the ATM location $L_{atmx}$ to the mobile phone location $L_{mp}$. Where mobile phone location $L_{mp}$ is equal to the ATM location $L_{atmx}$, control passes to block 80 where ATM location is confirmed. At block 78, where the mobile phone location $L_{mp}$ is different than the ATM location $L_{atmx}$, control passes to block 82 where a notice communication is generated indicating that the ATM location is inaccurate. After blocks 80 and 82, control passes back up to block 66 where the process continues to cycle as other consumers access the ATM 18 via location enabled phones or other location enabled devices.

It is contemplated that in at least some cases consumers that use location enabled mobile phones or other consumer devices that can be used to access ATMs may also maintain bank or other credit type cards associated with their accounts and that can be used to access ATMs as well. In these cases, when a consumer 20 uses a card to access an ATM and does not have her mobile phone or other location enabled device with her at the time of access, the process described above for confirming ATM location via the location enabled device could indicate that the ATM is at the location of the mobile phone as opposed to its actual location and an unintended notice communication would be generated. For this reason, in at least some embodiments, it is contemplated that several stored ATM location and phone location mis-matches will have to occur without a match prior to generating a notice communication.

Consistent with the above comments, Referring once again to FIG. 3, in at least some embodiments the ATM database 44 will include a mis-match location counter column 91 that includes a separate mis-match location counter for each one of the ATMs identified in column 48. Thus, for example, a first mis-match location counter $C_{A/1}$ identified by numeral 93 is associated with ATM 49 in column 48.

Figure 6:
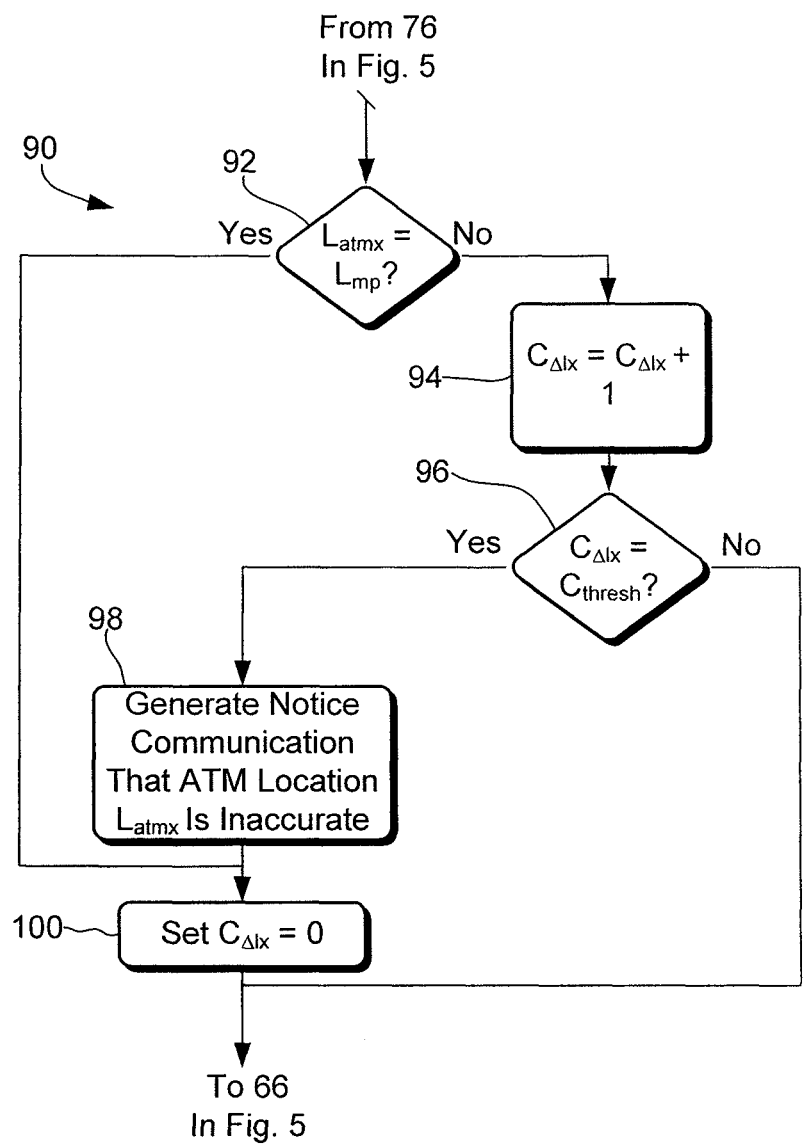
FIG. 6 is a flow chart illustrating a sub-process that may be substituted for a portion of the process shown in FIG. 5 wherein notice of an inaccurate stored ATM location is provided only after mobile phone or other device locations mismatch the stored ATM location a number of times.

Referring to FIG. 6, a sub-process 90 that may be substituted for a portion of the process shown in FIG. 5 is illustrated. Here, it is assumed that a different location counter $C_{Alx}$ corresponding to a specific ATM is initially set equal to zero and that a count threshold value $C_{thresh}$ is set to a number of location mis-matches that has to occur without a location match in order to generate a notice communication. For example, the threshold value $C_{thresh}$ may be set equal to 30 in at least some embodiments. Referring also to FIG. 5, after block 76, control may pass to block 92 in FIG. 6. At block 92, manager 12 compares the stored ATM location $L_{atmx}$ to the mobile phone location $L_{mp}$. Where ATM location is equal to the mobile phone location, control passes to block 100 where counter $C_{Alx}$ is again set to zero after which control passes back to block 66 in FIG. 5. At block 92, where mobile phone location $L_{mp}$ is different than to the stored ATM location $L_{atmx}$, control passes to block 94 where the counter $C_{Alx}$ corresponding to the specific ATM is incremented by 1. At block 96, counter $C_{Alx}$ is compared to the threshold count value $C_{thresh}$. Where counter $C_{Alx}$ is less than the threshold count $C_{thresh}$, control passes to block 66 in FIG. 5 where the process continues as described above. However, at block 96, where counter $C_{Alx}$ is equal to the threshold count $C_{thresh}$, control passes to block 98 where the notice communication indicating inaccurate ATM location is generated. After block 98, counter $C_{Alx}$ is again set equal to zero and control then passes to block 66.

Another way to deal with situations where consumers may use either a location enabled device or a card to access an ATM so that location mismatches occur fairly regularly is to require that at least a certain percentage of mobile phone or device locations are consistent with the stored location for a specific ATM over a set number of transactions. For example, it may be required that at least 10 out of every 100 attempts to match phone location with the stored ATM location result in a matching comparison. To this end, referring once again to FIG. 3, database 44 may include a matching location counter column 111 which includes a separate matching location counter for each one of the ATMs identified in column 48. For instance, in column 111, matching location counter $C_{cl1}$ is associated with or corresponds to ATM 49 in column 48.

Figure 7:
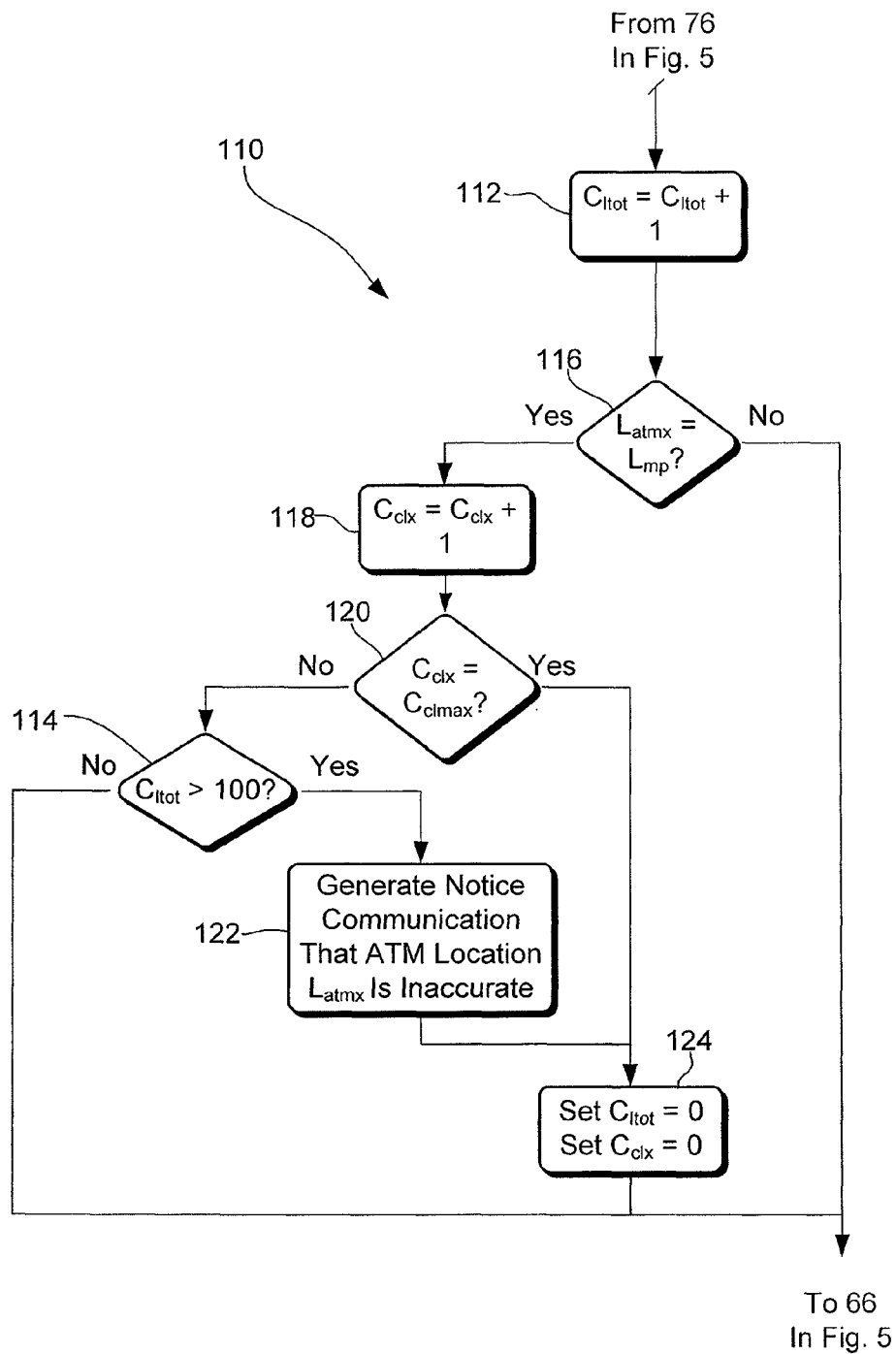
FIG. 7 is a flow chart illustrating a sub-process that may be substituted for a portion of the process shown in FIG. 5 wherein notice of an inaccurate stored ATM location is provided after a minimum matching percent is not met.

Referring now to FIG. 7, a sub-process that may be substituted for a portion of the process shown in FIG. 5 is illustrated for determining when the percentage of matches falls below a threshold percent. Initially, a transaction counter $C_{tot}$ is set equal to zero as is a separate correct or matching location counter $C_{clx}$ for each of the ATMs in the database 17. Also, initially, a maximum matching or correct location counter $C_{clmax}$ is set equal to the required percentage of correct or matching ATM locations. For instance, where 10 out of every 100 ATM location determining attempts must be accurate, counter $C_{clmax}$ is set equal to 10.

Referring still to FIG. 7 and also to FIGS. 1, 2, 3 and 5, after block 76, control may pass to block 112 where the total transaction counter $C_{tot}$ is incremented by one after which control passes to block 116. At block 116, the stored ATM location $L_{atmx}$ for the ATM identified in the access communication is compared to the mobile phone location $L_{mp}$. Where the mobile phone location $L_{mp}$ is different than the stored ATM location $L_{atmx}$, control passes back to block 66 in FIG. 5 where the process as described above is repeated. However, at block 116, where the mobile phone location $L_{mp}$ is equal to the stored ATM location $L_{atmx}$ so that there is a match between those locations, control passes to block 118 where the matching location counter $C_{clx}$ associated with the specific ATM is incremented by 1. At block 120 the matching location counter $C_{clx}$ for the ATM is compared to the maximum matching location value $C_{clmax}$ (i.e., in the present example counter $C_{clx}$ is compared to 10 which corresponds to a 10% or greater matching criteria). Where counter $C_{clx}$ is equal to the maximum value $C_{clmax}$ indicating that the matching percentage requirement has been met, control passes to block 124 where the total counter $C_{tot}$ and the correct location counter $C_{clx}$ are both reset to zero after which control passes back to block 66 in FIG. 5.

Referring still to FIG. 7, where the correct location counter $C_{clx}$ is less than the maximum value $C_{clmax}$, control passes to block 114. At block 114, where the total counter value $C_{tot}$ is greater than 100, control passes back to block 66 in FIG. 5 without resetting the total and correct counter values $C_{tot}$ and $C_{clx}$, respectively. However, at block 114, where the total counter $C_{tot}$ is greater than 100, less than ten out of the most recent 100 location comparisons resulted in a match and control passes to block 122 where a notice communication indicating inaccurate location is generated. After block 122 the total and correct location counters are reset to zero and control passes again to block 66 in FIG. 5.

Figure 4:
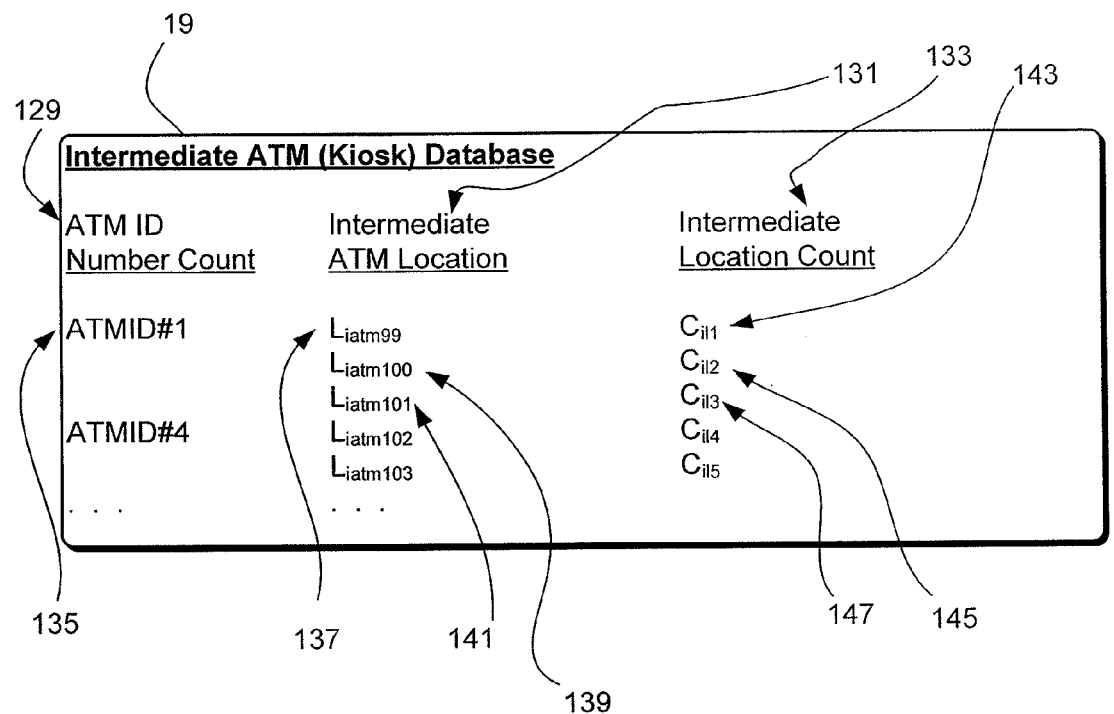
FIG. 4 is an intermediate ATM database that may be used by the locator service manager of FIG. 1.

It has been recognized that when the locations of mobile phones or other location enabled devices used to access an ATM correspond to a single location and that location does not match the stored ATM locations in ATM database 17, the stored location is likely wrong and the location reported by the phones or other devices is likely correct for the ATM. For this reason, when a single location is routinely reported for an ATM and that location does not match the stored location, in at least some embodiments it is contemplated that the server associated with the locator service manager 12 may be programmed to automatically change the location of the ATM in the ATM database 17. To this end, referring to FIGS. 2 and 4, in at least some embodiments, database 16 will include an intermediate ATM database 19. Database 19 includes an ATM ID number column 129, an intermediate ATM location column 131 and an intermediate location count column 133. ATM ID number column 129 lists all ATMs in the system 10 for which the most recent attempt to match the stored ATM location and the location of a mobile phone or other device used to access the ATM did not match. Column 131 lists at least one and in some cases several intermediate ATM locations for each of the ATMs listed in column 129. For example, three separate intermediate ATM locations, 137, 139 and 141 are listed for ATM 135 in column 129. Here, it is contemplated that only one of the intermediate locations in column 131 will correspond to the actual location of the ATM associated therewith in column 129, but that, at times more than one intermediate ATM location may occur (e.g., where multiple consumers use bankcards instead of their location enabled mobile phone to access a specific ATM). Column 133 includes a separate intermediate location counter for each of the intermediate locations in column 131. Thus, for instance, counters 143, 145 and 147 correspond to intermediate locations 135, 139 and 141 in column 131.

Figure 8:
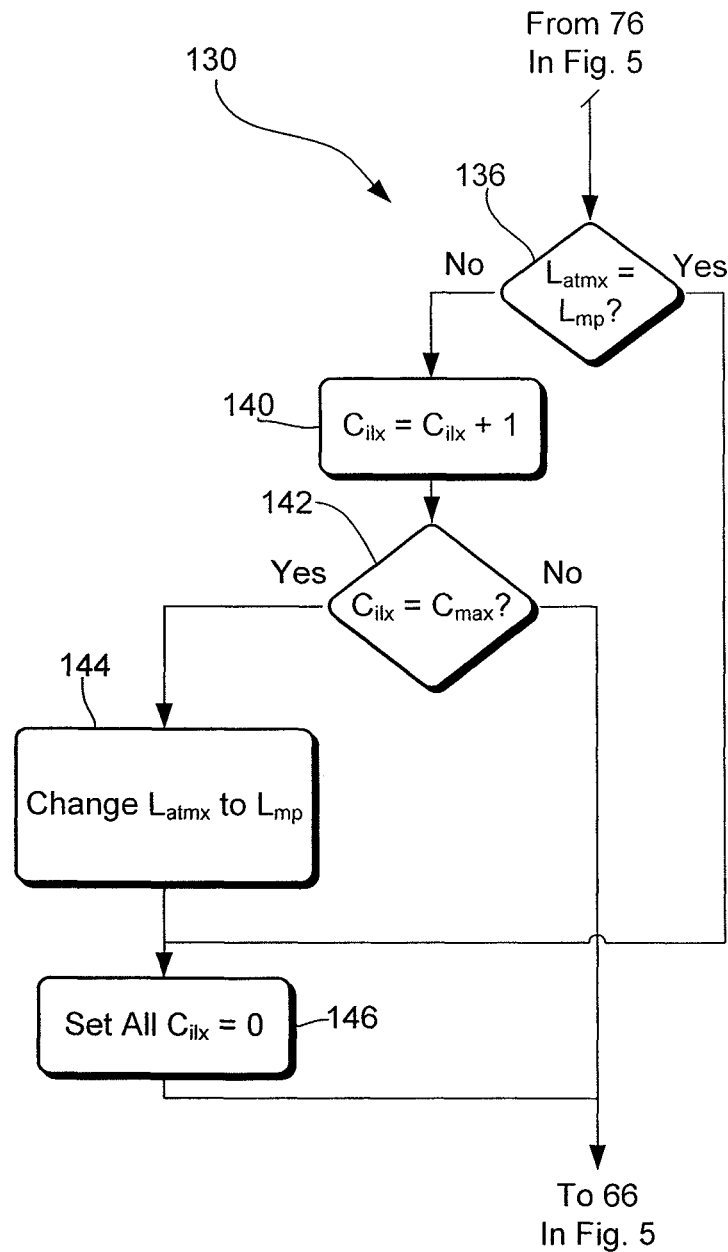
FIG. 8 is a sub-process that may be substituted for a portion of the process shown in FIG. 5 whereby the stored location of an ATM is modified when the locations of devices used to access the ATM are consistent over a set number of transactions and are different than the stored location.

Referring now to FIG. 8, a sup-process 130 for replacing a stored ATM location in database 17 when appropriate and that may be substituted for a portion of the process shown in FIG. 5 is illustrated. Here, initially it is assumed that a maximum count value $C_{max}$ is set which corresponds to a threshold number of consistent intermediate location determinations that has to occur without a match between the stored ATM location and the location of a device or phone used to access the ATM for a location substitution to be performed. For example, the maximum value $C_{max}$ may be set to 30 meaning that the intermediate ATM location $C_{ilx}$ must occur 30 times without one match between a phone location and the stored location for the specific ATM.

Referring once again to FIGS. 1 through 5 and 8, after block 76 in FIG. 5, control may pass to block 136 in FIG. 8 where the stored ATM location $L_{atmx}$ is compared to the mobile phone location $L_{mp}$. Where the locations are identical at block 136, control passes to block 146 where all of the intermediate location counters corresponding to the specific ATM are reset to zero values. After block 146, control passes to block 66 in FIG. 5 where the process described above is repeated.

At block 136, where the mobile phone location $L_{mp}$ is different than the stored ATM location $L_{atmx}$, control passes to block 140 where an intermediate location counter $C_{ilx}$ corresponding to the mobile phone location $L_{mp}$ (i.e., corresponding to the intermediate ATM location $L_{iatmx}$—see locations in column 131 in FIG. 3) is incremented by 1. Next, at block 142, counter $C_{ilx}$ is compared to the maximum count value $C_{max}$. Where counter $C_{ilx}$ is less than the maximum value $C_{max}$, control passes to block 66 in FIG. 5. However, at block 142, once the counter $C_{ilx}$ is equal to the maximum count value $C_{max}$, control passes to block 144 where the stored ATM location $L_{atmx}$ is changed to the reported device or phone location $L_{mp}$ in the ATM database 17. After block 144, all of the counters corresponding to the ATM for which the location has been changed in the database 17 are reset to zero and control again passes to block 66 in FIG. 5.

Figure 9:
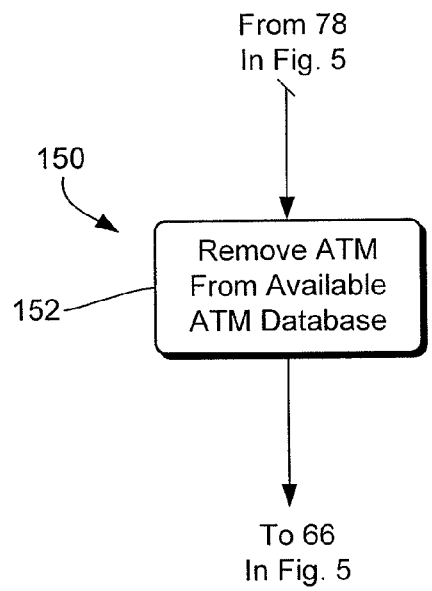
FIG. 9 is a sub-process that may be substituted for a portion of the process shown in FIG. 5 whereby ATMs are removed from a database when stored locations thereof are inaccurate.

In at least some embodiments it is contemplated that, whenever criteria is met for transmitting a notice communication that the stored location of an ATM is incorrect, in response to the notice communication, the locator service manager 12 (see again FIG. 1) may automatically remove the ATM from an available ATM list or database. Thus, for instance, referring again to FIG. 3, where ATM database 17 is an available ATM database, assuming the stored location 51 corresponding to ATM 49 is determined to be inaccurate, ATM 49 would be removed from database 44 or otherwise rendered unusable for providing resource options to consumers as part of a locator service. In this way, when a consumer uses the locator service, only ATM locations that are confirmed as accurate would be presented to the consumer as options. Consistent with these comments, FIG. 9 illustrates a sub-process 150 that may be substituted for block 82 in FIG. 5. Referring also to FIG. 5, after block 78, if the mobile phone location is different than the stored ATM location, control may pass to block 152 in FIG. 9 where the ATM is removed from the available ATM list after which control passes back up to block 66 in FIG. 5. Here, it should be appreciated that the ATM removal step may be performed as part of either of the sub-processes illustrated in FIG. 6 or 7 instead of simply generating a notice communication at blocks 98 and 122, respectively.

Figure 10:
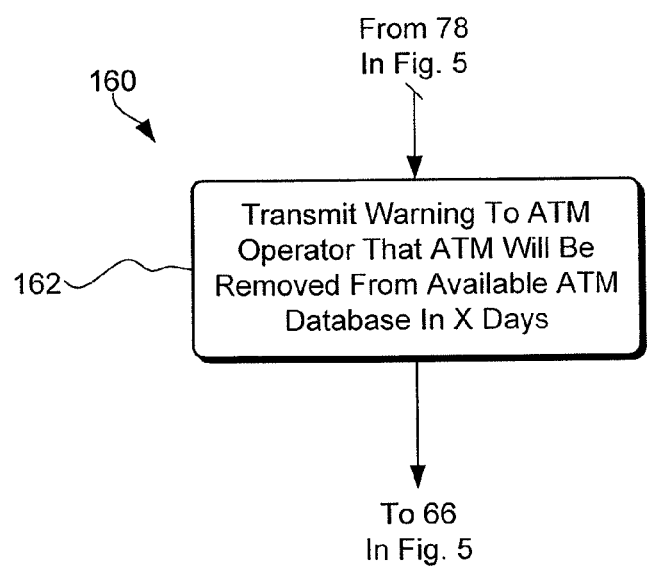
FIG. 10 is a sub-process that may be substituted for a portion of the process shown in FIG. 5 wherein a warning is transmitted to an ATM operator when stored ATM location information is inaccurate.

Instead of immediately removing an ATM from the available ATM database, in at least some embodiments it is contemplated that a warning may be transmitted to an ATM operator indicating that the operator should correct the location information and specifying a time at which the ATM will be removed from the available ATM database if the location information is not corrected. For example, manager 12 may be programmed to give an ATM operator ten days in which to correct erroneous ATM location information. Consistent with these comments, FIG. 10 illustrates a sub-process that may be substituted for block 82 in FIG. 5. Referring also to FIG. 5, at block 78 where the mobile phone location $L_{mp}$ is different than the stored ATM location $L_{atmx}$, control may pass to block 162 in FIG. 10 where a warning communication is transmitted to the ATM operator indicating that the ATM will be removed from the available ATM database within a specified period of time if the location information is not corrected. After block 162, control then passes back up to block 66 in FIG. 5 where the process described above continues. Where the locator service manager 12 has developed information regarding the likely correct location of an ATM or other type kiosk, the notice to the ATM operator may specify the likely correct location and request confirmation from the operator. Upon confirmation, the correct location would be swapped in the database for the previously stored location. Here it should be noted that the sub-process 160 shown in FIG. 10 may be substituted for either of blocks 98 or 122 in FIGS. 6 and 7, respectively, to give an ATM operator an opportunity to correct location information that is inaccurate before pulling the ATM from the available ATM database.

Figure 11:
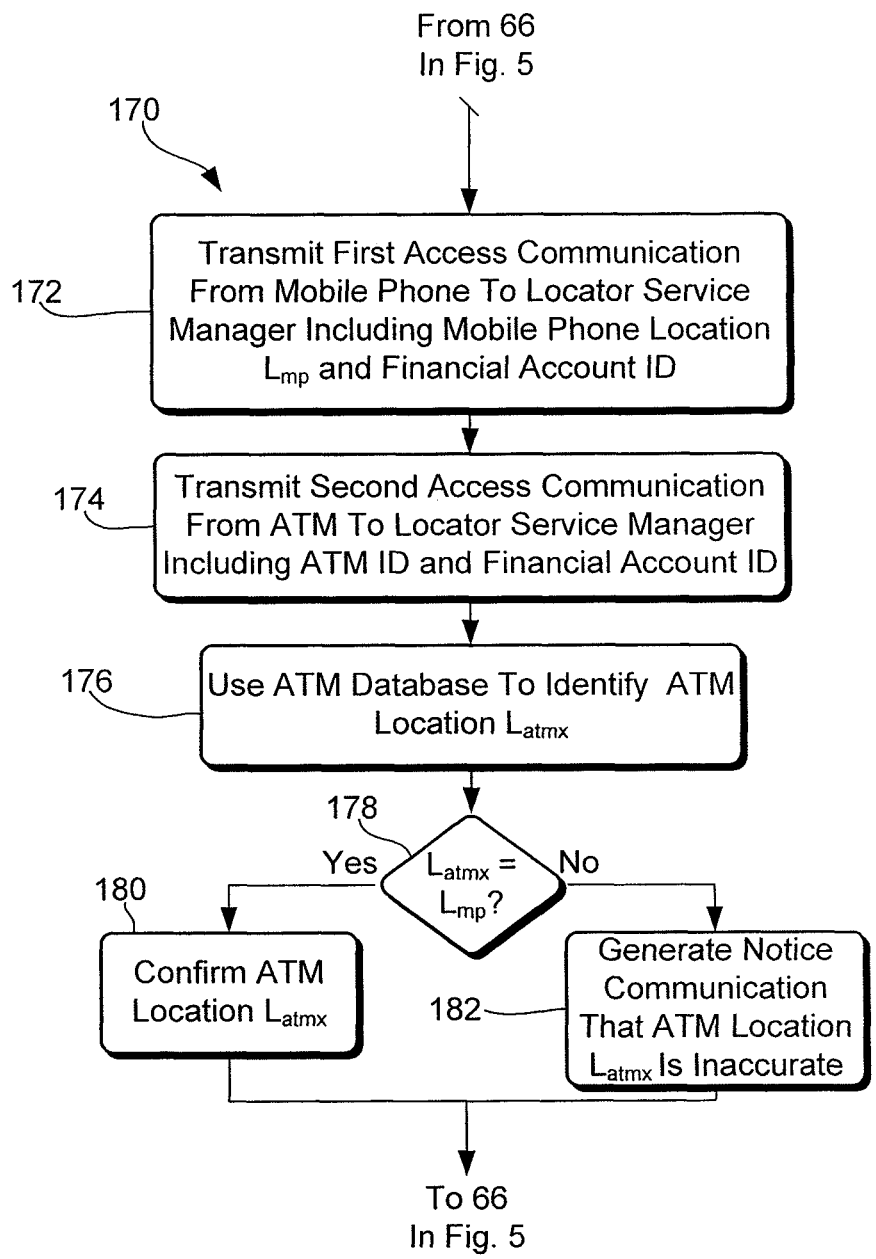
FIG. 11 is a sub-process that may be substituted for a portion of the process shown in FIG. 5 wherein a location enabled device transmits location information automatically to a location service manager each time an ATM is accessed using the device.

Although the system described above requires the locator service manager 12 to start the process whereby the location of the mobile phone 24 is identified, in at least some embodiments it is contemplated that mobile phone 24 may automatically transmit location information to a locator service manager 12 whenever an ATM is accessed and without requiring a location request communication from the manager 12. To this end, a sub-process 170 that may be substituted for the portion of the process shown in FIG. 5 is illustrated in FIG. 11. Referring also to FIGS. 1, 2, 3 and 5, after block 66 in FIG. 5, control may pass to block 172 in FIG. 11. At block 172, after the mobile phone 24 is used to access the ATM 18, mobile phone 24 automatically transmits a first access communication to the locator service manager including the mobile phone location $L_{mp}$ and financial account information usable to identify the consumer's account number associated with the account accessed via ATM 18. At block 174, ATM 18 transmit a second access communication to manager 12 including ATM ID or other identifying information and financial account information corresponding to the account accessed by the consumer. At block 176, manager 12 uses the ATM database 17 to identify a stored location $L_{atmx}$ associated with the ATM 18. At block 178, where the mobile phone location $L_{mp}$ is equal to the stored ATM location $L_{atmx}$, control passes to block 180 where the stored ATM location is confirmed. Where the mobile phone location $L_{mp}$ is different than the ATM location $L_{atmx}$, control passes to block 182 where a notice communication is generated indicating that the stored ATM location is inaccurate.

Figure 12:
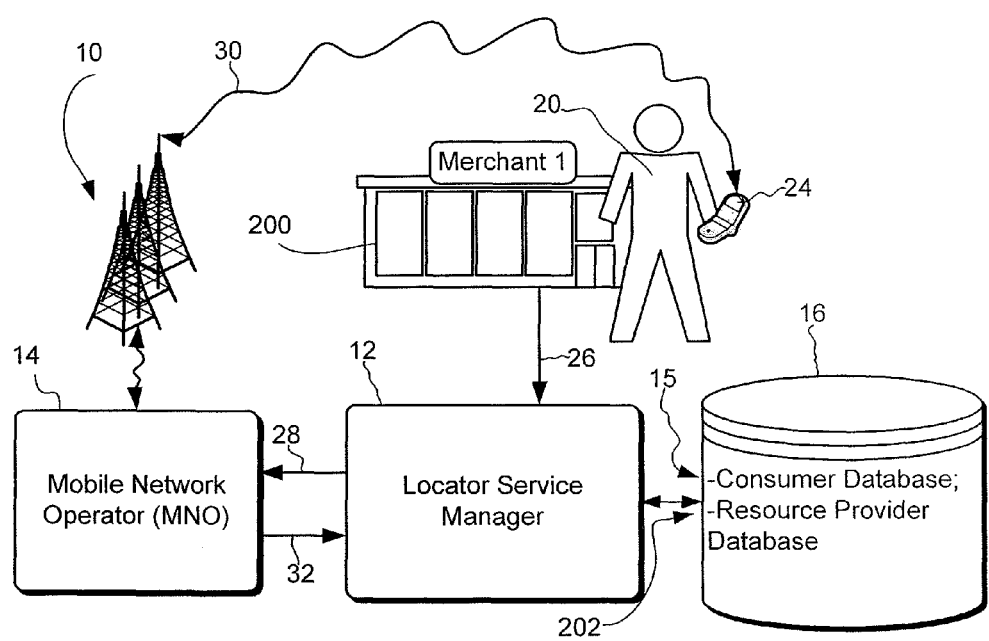
FIG. 12 is a schematic diagram similar to the one shown in FIG. 1, albeit where the system is used to verify, confirm and/or modify merchant locations as a function of the locations of devices used to facilitate transactions with the merchants.

Referring now to FIG. 12, a system similar to that described above with respect to FIG. 1 is illustrated where similar components or entities are identified using the same numerals described above. The primary difference between the system in FIG. 1 and the system in FIG. 12 is that, while the system in FIG. 1 is used to confirm or verify ATM locations, the system in FIG. 12 is used to confirm or verify locations of other resource providers such as merchants, healthcare providers, etc. Here, when a location enabled mobile phone or other type device is used to purchase goods or services at a location associated with a merchant or other resource provider, any of the processes described above may be performed for identifying the location of the mobile phone 24 and then the location of that phone may be compared to a stored location associated with the merchant to determine whether or not the merchant's location information is accurate. Where the information is inaccurate, the merchant location information may be modified immediately and automatically or after notice has been sent to the merchant requesting that the merchant update the location information itself. To support the locator service manager 12, database 16 includes a resource provider database 202 as opposed to an ATM database. Although not shown in detail, the resource provider database 202 would be similar to the ATM database 17 described above with respect to FIG. 3 and may be supplemented with counters and/or an intermediate merchant database as described above with respect to FIGS. 3 and 4 for supporting sub-processes akin to the sub-processes shown in and described above with respect to FIGS. 6-10.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims. For example, while the system described above requires the service manager (see 12 in FIG. 1) to communicate with mobile devices 24 via a mobile network operator 14, in at least some embodiments it is contemplated that the service manager itself may be able to communicate directly with devices 24 to request and receive location information therefrom. In addition, while the systems described above include mobile devices that can determine their own locations, in some embodiments a separate subsystem of components may be provided that determines mobile device location and that provides that location information to the locator service manager. For instance, a set of access points within an airport may receive beacon signals generated by a mobile device which can be used by a server to determine mobile device location.

Moreover, while the percentage match counters described above with respect to FIG. 7 contemplates restarting the counter after 100 transactions, in other embodiments the counter may be a rolling value so that when the transaction count exceeds 100, the results of location comparisons of next transactions are added to the 100 and oldest results are discarded.

Furthermore, prior to correcting ATM location in the FIG. 8 sub-process described above, in at least some embodiments an ATM operator/owner may be queried to seek authorization to change location and the new location may be suggested via an e-mail or the like.

The various participants and elements described above may operate or be implemented using one or more computer apparatuses to facilitate the functions described herein.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A system for maintaining a list of resources and associated resource locations, the system comprising:
    a resource database that specifies locations of resources for use by consumers;
    a processor that has access to the resource database; and
    a non-transitory computer-readable medium comprising code executable by the processor, the code comprising instructions for the processor to perform the steps of:
    receiving a location communication originated by a consumer device associated with a consumer at a time temporally proximate a time when the consumer accesses a resource using the consumer device where the location communication indicates a first location information associated with the consumer device;
    receiving an access communication comprising resource identifying information;
    identifying a second location associated with the resource from the resource identifying information;
    comparing the first location information and the second location information;
    providing a notice communication to a location service manager, owner, or operator of the resource, if the first location information does not match the second location information, wherein providing the notice communication comprises providing the notice communication only if a mismatch location counter exceeds a threshold count; and
    updating the second location information associated with the resource in the resource database with the first location information, if the first location information does not correspond to the second location information.

2. The system of claim 1 wherein the consumer device is a GPS enabled mobile consumer device.

3. The system of claim 1 wherein the computer-readable medium further comprises instructions for the processor to perform the step of prior to providing the notice communication, determining a value for a mismatch location counter.

4. The system of claim 1, wherein the computer-readable medium further comprises instructions for the processor to perform the steps of:
    tracking a duration of a period since a last verification event for the resource listed in the resource database; and
    performing a notice function when the period since the last verification event for the resource exceeds a maximum verification period.

5. The system of claim 4 further comprising:
    an available resource database for access by consumers that lists resources that are available for use by consumers;
    wherein the notice function includes removing a resource from the available resource database for which the period since the last verification event exceeds the maximum verification period.

6. The system of claim 1 wherein the access communication comprises an account number and a PIN previously transmitted wirelessly from the consumer device to the resource.

7. A method to be implemented using a computer system, the method comprising the steps of:
    receiving a location communication originated by a consumer device associated with a consumer at a time temporally proximate a time when the consumer accesses a resource using the consumer device where the location communication indicates a first location information associated with the consumer device;
    receiving an access communication comprising resource identifying information;
    identifying a second location associated with the resource from the resource identifying information;
    comparing the first location information and the second location information;
    providing a notice communication to a location service manager, owner, or operator of the resource, if the first location information does not match the second location information, wherein providing the notice communication comprises providing the notice communication only if a mismatch location counter exceeds a threshold count; and
    updating the second location information associated with the resource in the resource database with the first location information, if the first location information does not correspond to the second location information.

8. The method of claim 7 wherein the consumer device is a GPS enabled mobile consumer device.

9. The method of claim 7 wherein the method further comprises prior to providing the notice communication, determining a value for a mismatch location counter.

10. The method of claim 7 wherein the method further comprises:
   tracking a duration of a period since a last verification event for the resource listed in the resource database; and
   performing a notice function when the period since the last verification event for a resource exceeds a maximum verification period.

11. The method of claim 7 further comprising:
   providing an available resource database for access by consumers that lists resources that are available for use by consumers;
   wherein the notice function includes removing a resource from the available resource database for which the period since the last verification event exceeds the maximum verification period.

12. The method of claim 7 wherein the access communication comprises an account number and a PIN previously transmitted wirelessly from the consumer device to the resource.

13. The system of claim 6, wherein a plurality of account numbers are associated within as single consumer device in the resource database.

14. The system of claim 6, wherein a single account number is associated with a plurality of consumer devices in the resource database.

15. The system of claim 1, wherein a location mismatch occurs when the first location information does not correspond to the second location information, and wherein a predefined number of location mismatches must occur without a match prior to generating the notice communication.

16. The System of claim 1, further comprising a consumer database including information related to the consumer device correlated with information specifying one or more account numbers of the consumer.

17. The system of claim 1 wherein the access communicatin further comprises an account number of the consumer.

18. The system of claim 17 wherein the first location information associated with the consumer device is determined by accessing the consumer database and using the account number in the access communication to identify the consumer device associated therewith.

* * * * *